United States Patent
Mahapatra et al.

(10) Patent No.: US 9,836,342 B1
(45) Date of Patent: Dec. 5, 2017

(54) APPLICATION ALERTING SYSTEM AND METHOD FOR A COMPUTING INFRASTRUCTURE

(71) Applicant: VCE Company, LLC, Richardson, TX (US)

(72) Inventors: Akshaya Mahapatra, San Jose, CA (US); Michael Tan, Palo Alto, CA (US); Rahul Talekar, San Jose, CA (US)

(73) Assignee: VCE IP Holding Company LLC, Richardson, TX (US)

( * ) Notice: Subject to any disclaimer, the term of this patent is extended or adjusted under 35 U.S.C. 154(b) by 139 days.

(21) Appl. No.: 14/479,050

(22) Filed: Sep. 5, 2014

(51) Int. Cl.
*G06F 11/00* (2006.01)
*G06F 11/07* (2006.01)
*G06F 11/14* (2006.01)
*G06F 11/20* (2006.01)

(52) U.S. Cl.
CPC ...... *G06F 11/0769* (2013.01); *G06F 11/0712* (2013.01); *G06F 11/0793* (2013.01); *G06F 11/1438* (2013.01); *G06F 11/202* (2013.01)

(58) Field of Classification Search
CPC ..... G06F 11/20; G06F 11/2002; G06F 11/202
See application file for complete search history.

(56) References Cited

U.S. PATENT DOCUMENTS

| 2002/0077800 | A1* | 6/2002 | Kampe | G06F 11/008 703/21 |
|---|---|---|---|---|
| 2008/0235366 | A1* | 9/2008 | Telfer | H04L 12/2602 709/224 |
| 2008/0307259 | A1* | 12/2008 | Vasudevan | G06F 11/0712 714/23 |
| 2011/0191627 | A1* | 8/2011 | Koning | G06F 11/20 714/5.1 |
| 2012/0331172 | A1* | 12/2012 | Mansur | H04L 49/90 709/234 |
| 2014/0143516 | A1* | 5/2014 | Dawson | G06F 12/0253 711/171 |

* cited by examiner

*Primary Examiner* — Bryce Bonzo
*Assistant Examiner* — Jonathan Gibson
(74) *Attorney, Agent, or Firm* — Polsinelli PC (57) ABSTRACT

An application alerting system includes a computing system that executes an application alerting service monitor at least one of multiple computing resources configured in a computing infrastructure to determine whether the one monitored computing resource experiences a failure. When a failure is detected, the service transmits a failure notification to applications associated with the failed monitored computing resource such that the application may perform at least one remedial action according to the received failure notification.

20 Claims, 9 Drawing Sheets

APPLICATION ALERTING SYSTEM AND METHOD FOR A COMPUTING INFRASTRUCTURE

TECHNICAL FIELD

Aspects of the present disclosure relate to computing devices and, in particular, to an application alerting system and method.

BACKGROUND

Computing environments used by enterprises, such as corporations and universities, are often provided by multiple computing devices that function in a collaborative manner to meet the computing resource needs of the enterprise. With the advent of the cloud and increased needs for stable computing environments, converged infrastructures were introduced that provided a standardized package of components that were combined into a single, optimized computing solution. Converged infrastructures commonly used today are implemented with a virtual computing environment that includes a structured combination of multiple virtual objects that are executed on independently functioning hardware resources commonly referred to as hosts.

SUMMARY

An application alerting system includes a computing system that executes an application alerting service monitor at least one of multiple computing resources configured in a computing infrastructure to determine whether the one computing resource experiences a failure. When a failure is detected, the service transmits a failure notification to applications associated with the failed computing resource such that the application may perform at least one remedial action according to the received failure notification.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; the emphasis instead is being placed on illustrating the principles of the technological concepts. Also, like reference characters may refer to the same components, features, and the like throughout the different views. The drawings depict only typical embodiments of the present disclosure and, therefore, are not to be considered limiting in scope.

DETAILED DESCRIPTION

Embodiments of the present disclosure provide a system and method for alerting applications which may be executing in a computing infrastructure of failures encountered by computing resources that execute these applications. Upon receipt of the failure indications, each application may take one or more types of remedial actions according to the nature and type of failure. Although computing infrastructures provide relatively good performance using large quantities of virtual objects that function in a collaborative manner, a failure in only a small subset of the virtual objects may cause significant degradation of the overall performance of the computing infrastructure. Embodiments of the application alerting system and method described herein provides a solution to these problems, among other problems, by monitoring computing resources (e.g., hosts and virtual objects) of a computing infrastructure for failures and notifying applications about these failures in a manner that allows each application to perform one or more remedial actions to compensate for the failed condition of the computing resources.

Figure 1:
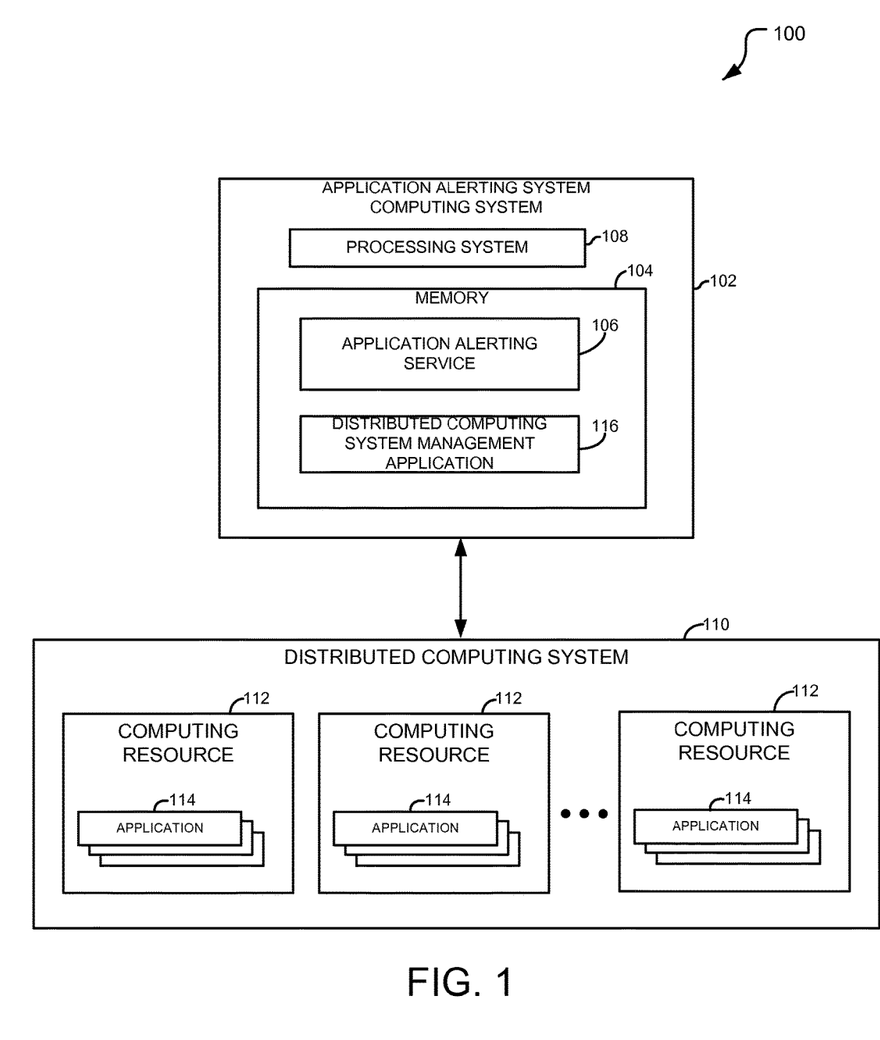
FIG. 1 illustrates an example application alerting system according to one embodiment of the present disclosure.

FIG. 1 illustrates an example application alerting system 100 according to the teachings of the present disclosure. The system 100 includes an application alerting computing system 102 having a memory 104 for storing an application alerting service 106 that is executed by a processing system 108. The application alerting service 106 communicates with a computing infrastructure 110 to monitor multiple computing resources 112 of the computing infrastructure for failures or other issues that affect performance of any one or more of the computing resources, and alerts or notifies applications 114 associated with the failures. Moreover, the applications 114 are responsive to the notifications to take one or more remedial actions to compensate for the failures until the failures have been resolved.

There are numerous types of computing resource failures that can cause reduced performance of the applications 114 executed on the computing resources 112. In general, a failure of a computing resource 112 may be any type that causes the performance of one, some, or all applications 114 executed on that computing resource to suffer. For example, an application may suffer reduced performance when its associated computing resource is overloaded (e.g., excessive memory and/or processor usage). As another example, an application may suffer reduced performance when executed on a computing resource 114 that does not provide ample processing power. As yet another example, an application 114 may suffer reduced performance when network bandwidth is not sufficient to convey data to/from the application 114 in a timely manner. Computing resource failures such as these are commonly referred to as soft failures in that, while the computing resource does not entirely cease to function, its performance has degraded to a level that causes any associated application's performance to suffer. Examples of hard failures that may also cause the performance of applications to suffer include a computing resource 112 that has lost network connectivity, and one or more other neighboring computing resources that go down (e.g., cease to function).

In many cases, it would be beneficial for applications 114 to react appropriately according to the operating condition of computing resources on which they are executed and/or other computing resources that execute other applications in communication with the subject application. Nevertheless, conventional management systems used in computing infrastructures have not enabled such behavior. For example, certain computing infrastructure monitoring tools provide user alerts for manual intervention (e.g., by administrators) of affected applications when their associated computing resources fail. These third party tools may also facilitate the performance of some basic actions due to computing resource failures, such as the provisioning of additional virtual objects when processor utilization exceeds a specified amount (e.g., >80 percent processor utilization), or allocating additional memory for the virtual objects when memory utilization exceeds a specified amount (e.g., >90 percent memory utilization). Nevertheless, these basic actions are directed to the computing resources that execute the applications and not the applications per se. That is, these third party tools do not provide any means for alerting applications that any associated computing resources have failed, nor do they provide any means for the applications to take remedial actions in response to receiving notice that these computing resource have failed.

Embodiments of the present disclosure provide a solution to these problems using the application alerting service 106 that continually monitors computing resources 112 in a computing infrastructure 110 and alerts applications of failures as they occur such that the applications 114 may take one or more remedial actions to compensate for the failures until they are corrected. Although embodiments of the present disclosure as described herein are directed to application management of computing infrastructures, it is contemplated that other embodiments may be applied to any computing system on which one or more applications are executed. Additionally, the system 100 may provide a software development platform whereby applications may be developed to effectively handle various failure scenarios according to their own particular needs. For example, certain applications that are computationally intensive may desire to react more readily to excessive processing load failures while reacting less readily to network communication failures. Thus, developers of these applications may implement such behavior into the application 114 such that it functions optimally under the numerous failure scenarios that may be encountered during operation within the distributed computing environment. As another example, certain applications that rely heavily on communication with other applications may be developed to incorporate one or more expandable buffers that may be expanded during network communication failures and/or include one or more connection state buffering mechanisms to handle various communication negotiating processes, such as handshaking protocols, connection establishment protocols, authorization/authentication protocols, and the like.

The applications 114 may take any suitable type of remedial action for compensating for failures of their associated computing resources 112. Examples of remedial actions that may be taken by an application include halting and/or slowing any services it provides, limiting its data transmitting/receiving rate, and/or migrating to another computing resource until the failure is corrected. Nevertheless, it should be understood that the remedial actions described herein are not conclusive and that an application 114 may perform any suitable remedial action to compensate for computing resource failures exhibited by the computing infrastructure 110.

The system 100 may also include a computing infrastructure management application 116 (FIG. 1) that manages various activities of the computing infrastructure 110, such as the application alerting service 106, and may also manage operation of the hosts 202 and virtual objects 204 of the computing infrastructure 110. For example, the computing infrastructure management application 116 manages the allocation and de-allocation of resources, such as hosts and virtual objects used by the system. Additionally, the computing infrastructure management application 116 may manage the remediation of failures in the system by monitoring the health of each resource and performing corrective measures, such as migration (e.g., failover) of applications 114 to different computing resources 112 in the event that certain computing resources 112 have failed. In one embodiment, the application 116 comprises a VSPHERE™ software suite that is available from VMware Corporation, which is located in Palo Alto, Calif.

The computing resources 112 of the computing infrastructure 110 generally represent hardware resources and/or one or more virtual objects executed on those hardware resources, which may be implemented in a virtual computing environment. The virtual computing environment may be embodied in any computing system that provides virtualized components (virtual objects) executed on one or more physical hosts. Such a computing environment may be provided in whole or in part through a converged infrastructure. Converged infrastructures typically refer to computing systems implemented in a virtual computing environment that includes a structured combination of multiple virtual objects that are executed on independently functioning hardware resources commonly referred to as hosts. Computing infrastructures 110 implemented in a virtual computing environment may be advantageous in that they are dynamically configurable to continually adapt to ever changing requirements typically exhibited by modern computing infrastructures. Converged infrastructures may involve multiple computing components pre-integrated into an optimized computing solution. The computing components of a converged infrastructure solution may include servers, data storage components, networking equipment and software for managing the integrated components. To assist in the scalability, management and sharing of resources, particularly in large data center environments, converged infrastructures may involve a pool of server, storage and networking capacities, typically virtualized, that can shared by multiple applications. While some examples disclosed herein reference converged infrastructures, they may also be referred to as unified computing systems, fabric-based computing systems, and dynamic infrastructures; systems and method described herein may be applied to other computing environments.

Computing resources 112 of a converged infrastructure may include resources, such as data processing devices, data storage devices, servers, networking equipment, and/or other computing devices. A converged infrastructure includes a combination of these devices that are packaged and interconnected in a standardized manner for ease of maintenance and use. For example, a converged infrastructure 200 such as that shown in FIGS. 2A and 2B include components found in Vblock™ System infrastructure packages available from VCE, LLC, which is located in Richardson, Tex. Converged infrastructures are often implemented in environments where relatively high reliability and/or availability are desired, such as in an enterprise environment. Nevertheless, it is contemplated that any computing infrastructure, such as a computer cluster, computing grid, blade array, and/or other computing infrastructure may be configured using the teachings of the present disclosure.

Figure 2A:
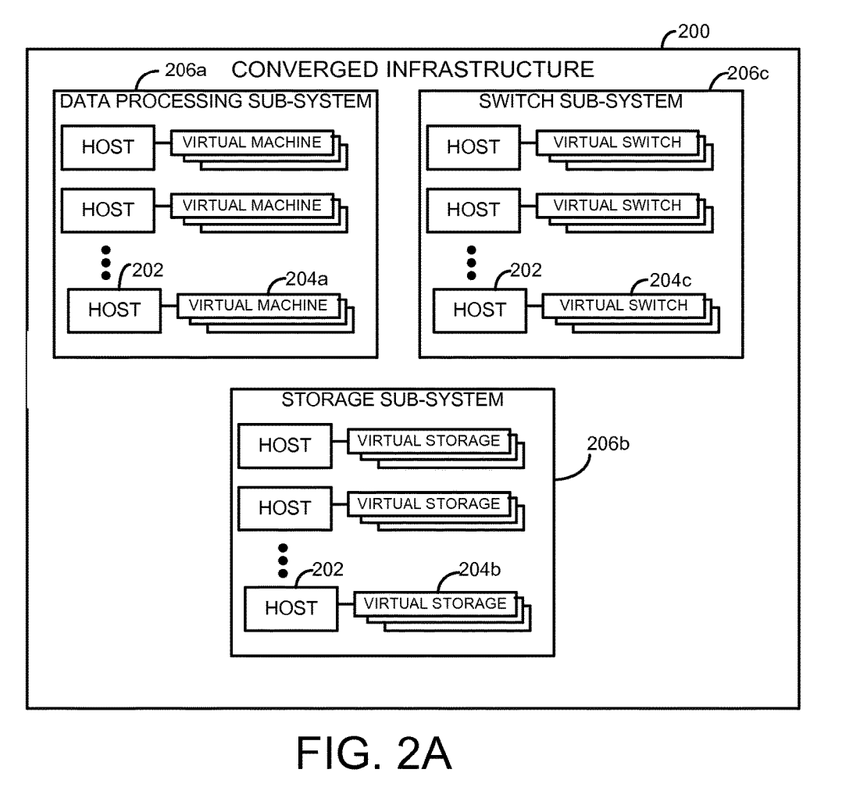
FIG. 2A illustrates an example converged infrastructure that may be implemented as a computing infrastructure according to one embodiment of the present disclosure.

FIG. 2A illustrates an example converged infrastructure 200 that may be implemented as a computing infrastructure 110 according to the teachings of the present disclosure. The converged infrastructure 200 may be any type having multiple hosts 202 that each executes one or more virtual objects (e.g., virtual machines 204a, virtual storage objects 204b, and virtual switch objects 204c). The hosts of a converged infrastructure are often referred to as compute servers. Nevertheless, a 'host' may be any physical device and/or component that supports the operation of virtual resources and services provided by those virtual resources. The particular converged infrastructure 200 as shown includes several sub-systems, such as a data processing sub-system 206a, a data storage sub-system 206b, and a switch sub-system 206c. Nevertheless, it should be understood that other converged infrastructures 104 may include additional, fewer, or different types of sub-systems without departing from the spirit and scope of the present disclosure.

Converged infrastructures may involve multiple computing components pre-integrated into an optimized computing solution. The computing components of a converged infrastructure solution may include servers, data storage components, networking equipment and software for managing the integrated components. To assist in the scalability, management and sharing of resources, particularly in large data center environments, converged infrastructures may involve a pool of server, storage and networking capacities, typically virtualized, that can shared by multiple applications.

In one aspect, the data storage sub-system 206b includes computer-readable memory structures for storing data used by the converged infrastructure 200, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 200, and may include components, such as fabric interconnect systems, Ethernet switches/routers, multilayer director switches (MDSs), and the like. The data processing sub-system 206a executes applications that access, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) 202 that each executes one or more virtual objects.

Each sub-system includes multiple hosts 202 that each executes one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMWARE ESX™ software suite that is available from VMware corporation, which is located in Palo Alto, Calif.

Figure 2B:
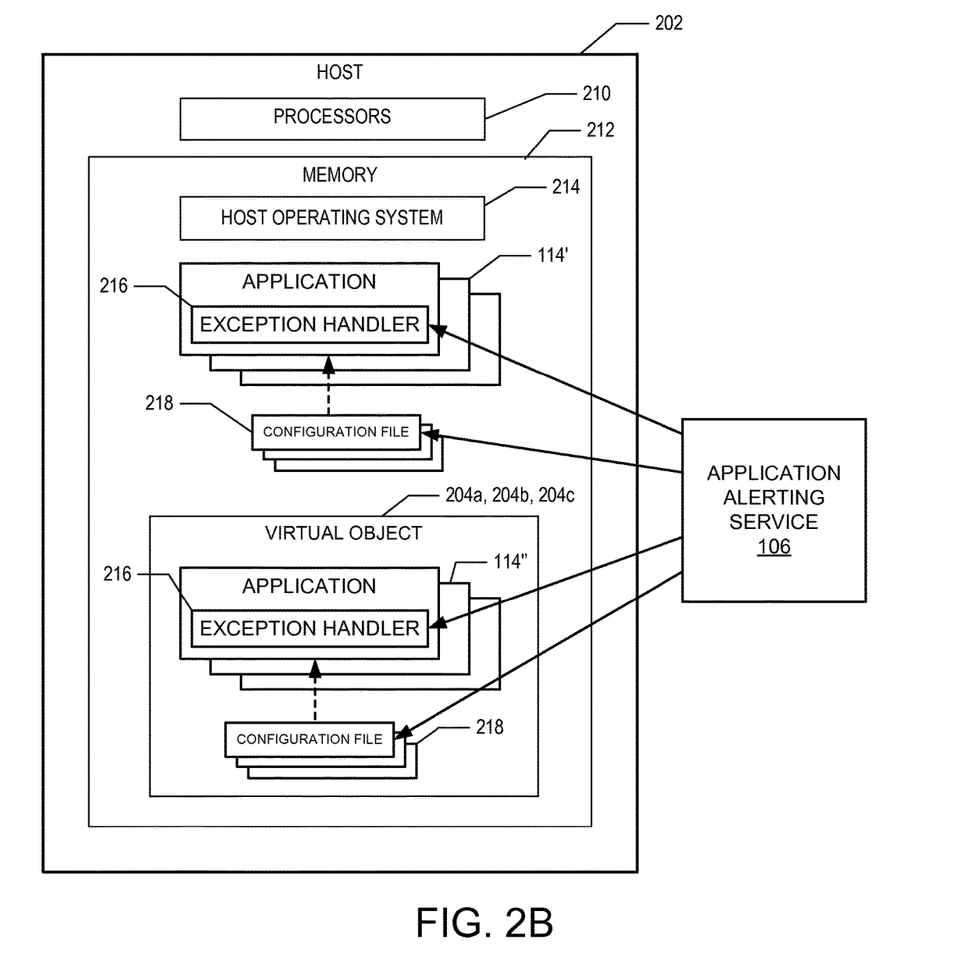
FIG. 2B illustrates an example host implemented on the converged infrastructure of FIG. 2A according to one embodiment of the present disclosure.

FIG. 2B illustrates an example host 202 implemented on the converged infrastructure 200 according to one aspect of the application alerting system 100. In general, the host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more virtual objects (e.g., VMs 204a, virtual storage objects 204b, and virtual switch objects 204c) that are executed by the processor 210. The host operating system 214 controls and manages the operation of the virtual objects executed on the host 202. For example, control signaling for starting, stopping, and/or changing operating parameters of each virtual object is managed through the host operating system 214.

The host 202 may store and execute applications 114', while the VMs 204a, 204b, and 204c may also store and executed applications 114". In one embodiment, one or more applications 114' or 114" may include an exception handler 216 that receives and processes failure notifications from the service 106. For example, an application 114 may be programmed during development to include one or more exception handling routines (e.g., exception handler 216) that perform remedial actions to the application when a computing resource failure indication is received from the application alerting service 106. In another embodiment, an application 114 may be associated with a configuration file 218 that includes information for governing and/or modifying the operation of its application 114. For example, the application 114 may be configured to periodically poll its associated configuration file 218 during runtime and modify its behavior (e.g., actions) based upon information included in the configuration file 218. The service 106 has the ability to modify the configuration file 216, thus enabling the application 114 to perform various remedial actions based on detected computing resource failures. The configuration file 218 may be implemented for cases in which the application 114 may not possess an exception handler 216 that has been programmed into the application 114 during its development.

Figure 3:
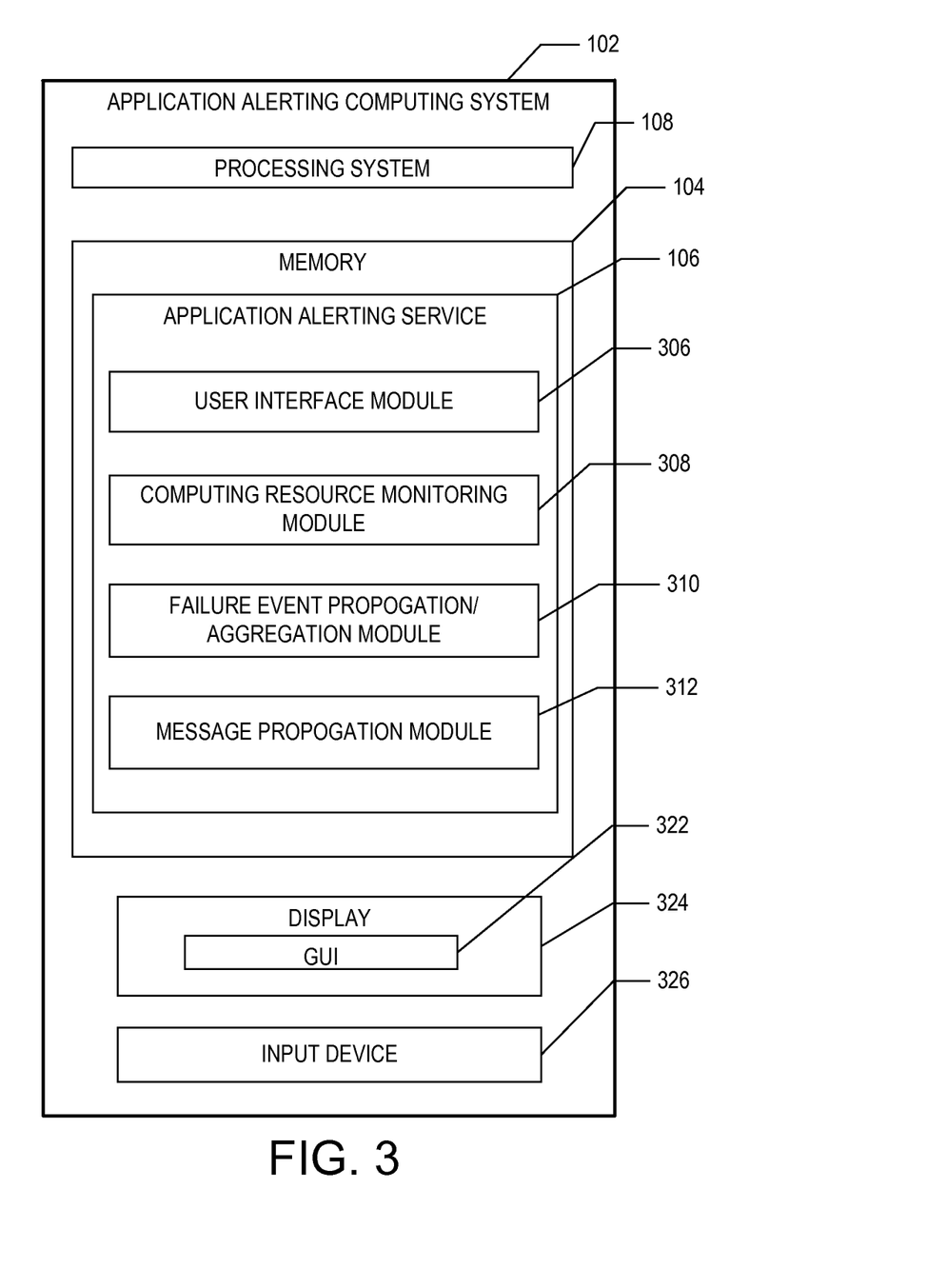
FIG. 3 illustrates an example block diagram of an example application alerting service executed on the application alerting computing system according to one embodiment of the present disclosure.

Referring now in more detail to FIG. 3, a block diagram of an example application alerting service 106 executed on the application alerting computing system 102, is depicted according to one aspect of the present disclosure. The application alerting service 106 is stored in a memory 104 (computer readable media) and executed on a processing system 108 of the computing system 102. The computing system 102 may include any type of computing system, such as one or more management computing systems, personal computers, mobile computers and/or other mobile devices, and other hosts. Additionally, the processing system 108 includes one or more processors that execute instructions of the application alerting service 106 and/or the computing infrastructure management application 116.

According to one aspect, the computing system 102 may include a graphical user interface (GUI) 322 displayed on a display 324, such as a computer monitor, for displaying data. The computing system 102 may also include an input device 326, such as a keyboard or a pointing device (e.g., a mouse, trackball, pen, or touch screen) to enter data into or interact with the GUI 322. According to one aspect, the application alerting service 106 includes instructions or modules that are executable by the processing system 108 as will be described in detail herein below.

The memory 104 includes volatile media, nonvolatile media, removable media, non-removable media, and/or another available medium. By way of example and not limitation, non-transitory computer readable media comprises computer storage media, such as non-transient storage memory, volatile media, nonvolatile media, removable media, and/or non-removable media implemented in a method or technology for storage of information, such as computer readable instructions, data structures, program modules, or other data.

A user interface module 306 facilitates the receipt of input data and/or output data from or to a user, respectively, for manipulating the operation of the system 100. In one example, the user interface module 306 may receive user input for manipulating or otherwise modifying how each application 114 is to react to failure notifications as they are received. The user interface module 306 may also be used to display records of past and/or present failure notifications generated and processed by the system 100 such that manual intervention may be applied to further tailor how the applications 114 perform remedial actions according to failures generated in the system.

A computing resource monitoring module 308 monitors the performance of the computing resources used in the computing infrastructure 110. In one embodiment, the computing resource monitoring module 308 periodically and/or aperiodically polls each computing resource 112 to determine any failures of the computing resources 112. For example, the resource monitoring module 308 may monitor the performance of each resource by communicating with an application executed on the computing resource, such as a task manager that continually monitors processing load and memory usage, to obtain performance characteristics of each resource. As yet another example, the resource performance monitoring module 308 may monitor a network analyzer, such as a sniffer device, to measure a throughput rate of data on a communication link to determine a throughput rate for that communication link. In another embodiment, the computing resource monitoring module 308 receives exception events received from the computing resources 112 to determine any failures in the computing resources 112. For example, the computing resource monitoring module 308 may receive exception event messages transmitted from communication-based computing resource (e.g., a router) that is configured to generate and transmit exception events according to a simple network management protocol (SNMP).

A failure event aggregation/categorization module 310 aggregates failure notifications from the computing resources 112 in the system 100, and categorizes the failures according to one or more criteria. For example, the failure event aggregation/categorization module 310 may categorize failure notifications according to the type of sub-system (e.g., data processing sub-system, switch sub-system, and/or storage sub-system), or according to a particular subset of computing resources 112 used to perform a certain task. The failure event aggregation/categorization module 310 may then use the categorized failure notifications to further tailor how the applications 114 executed on these computing resources 112 are to be notified. For example, the failure event aggregation/categorization module 310 may, upon categorizing the failure notifications, determine that an inordinate number of computing devices have failed due loss of a power sub-system. Thus, the failure event aggregation/categorization module 310 may send additional information to the applications 114 that instruct the applications 114 to migrate to certain other computing resources 112 that have not been compromised by the loss of the power sub-system.

In one embodiment, the failure event aggregation/categorization module 310 assigns a severity level to failure notifications according to a level of impact that the failure may have on each application 114. For example, the failure event aggregation/categorization module 310 may assign a relatively low severity level to a failure notification that is subsequently transmitted to an application 114 that is not directly affected by the failure, while assigning a relatively higher severity level to a failure notification that is subsequently transmitted to an application 114 that is substantially affected by the failure In another embodiment, the failure event aggregation/categorization module 310 determines a type of processing load incurred on each resource. The failure event aggregation/categorization module 310 may determine, using the devices described herein above, whether the loading is memory intensive, computationally intensive, and/or inter-resource communication loading level (e.g., input/output (I/O)) intensive. That is, the failure event aggregation/categorization module 310 may ascertain a level of memory usage, a computational loading level, and/or an inter-resource communication loading level of each resource.

A failure notification propagation module 312 propagates (e.g., transmits) the failure notifications to applications 114 that may be affected by the failure. The affected applications 114 include those that are executed by the computing resource 112 that has failed, in addition to other applications 114 that function with the applications 114 that are executed by the computing resource that has failed. In one embodiment, the failure notification propagation module 312 propagates the failure notifications using a messaging service, such as ACTIVEMQ™ and/or RABBITMQ™. In this case, each application 114 may register with the messaging service to listen to failure events in which the registration includes criteria associated with certain characteristics of the computing resources 112 that may affect their performance and/or behavior. Thereafter, when failure notifications are generated that meet the criteria specified during registration, the messaging service transmits the failure notifications to the application 114 so that remedial action may be taken.

In another embodiment, the failure notification propagation module 312 propagates the failure notifications using a cross-platform messaging system, such as a Java virtual machine (JVM) executed within a Java runtime environment (JRE). In this case, each application 114 may subscribe to certain messages within the JRE according to the nature and type of failure notifications received and processed by the application 114. Thereafter, when these failure notifications are generated, they may be forwarded to those applications 114 that subscribed to the failure notifications. In yet another embodiment, the failure notification propagation module 312 propagates the failure notifications to each application 114 using an inter-process communication technique (e.g., a remote procedure call (RPC)). For example, each application 114 upon initial execution, provides a callback mechanism to the failure notification propagation module 312 such that, when failure notifications are generated, they may be forwarded to the applications 114 using the callback mechanism.

It should be appreciated that the modules described herein are provided only as examples, and that the application alerting service 106 may have different modules, additional modules, or fewer modules than those described herein. For example, one or more modules as described in FIG. 3 may be combined into a single module. As another example, certain modules described herein may be encoded on, and executed on other computing systems, such as on one of the hosts of the converged infrastructure 200 as described above with reference to FIGS. 2A and 2B.

Figure 4A:
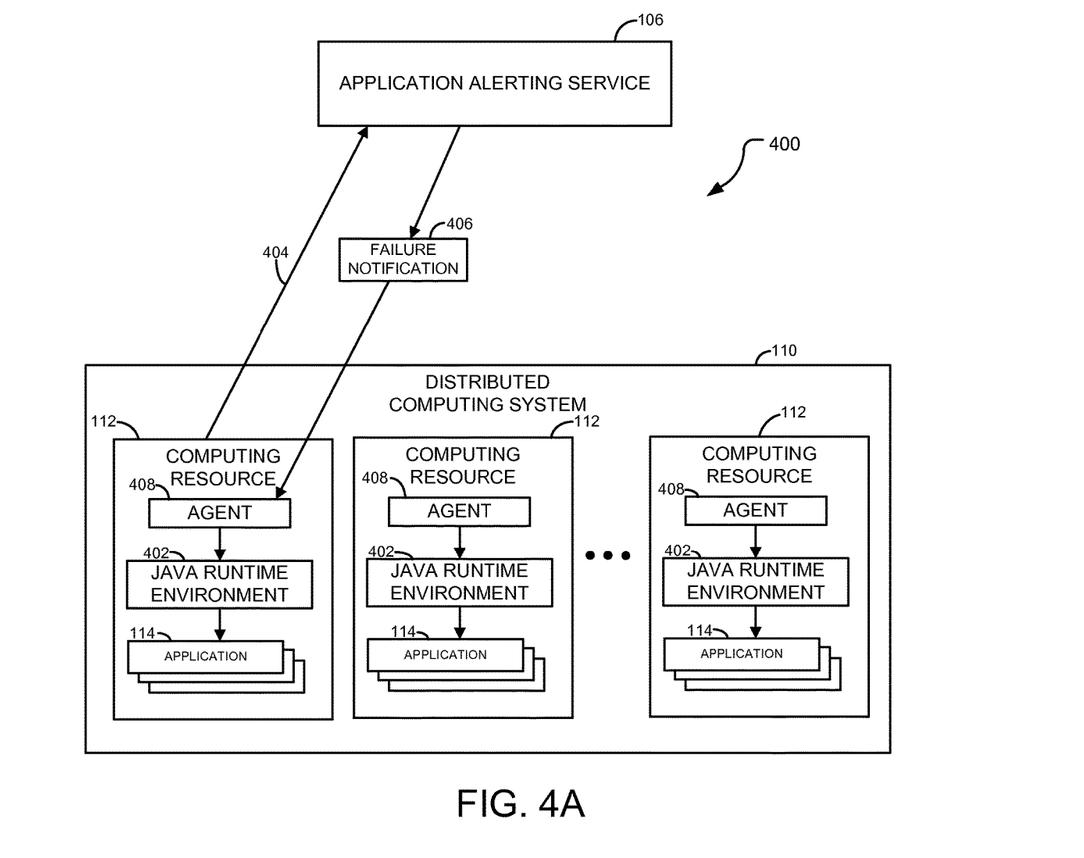
FIG. 4A illustrates an example implementation of the application alerting system according to one embodiment of the present disclosure.

FIG. 4A illustrates an example implementation of the application alerting system 400 according to one embodiment of the present disclosure. The particular implementation generally includes a java runtime environment (JRE) 402 executed on each of multiple computing resources 112 of the computing infrastructure 110. Although the particular example shows and describes a JRE, it should be understood that any type of cross-platform alerting system may be used according to the teachings of the present disclosure.

When the application alerting service 106 detects a failure 404 of a computing resource 112, it transmits a failure notification 406 to an agent 408 that communicates with the JRE 402 for propagated the failure notification 406 to affected applications 114. That is, the JRE 402 propagates failure notifications 406 to each application 114 executed on its respective computing resource 112.

Many cross-platform messaging systems do not scale well when used with computing infrastructures. That is, many event monitoring systems are adapted for use within a single computing resource, and are generally not well adapted for use with applications 114 executed on other computing resources. Implementation of the agent 408 provides a solution to this problem by managing communication between the JRE executed on each computing resource 112 with the application alerting service 106 for propagating failure notifications from the application alerting service 106 to each application 114 that may be affected by the failures indicated in the failure notifications.

In general, the agent 408 transmits the failure notification to each affected application 114 by using the JRE 402 to interrupt a thread (e.g., Java thread) in which the application 114 is executed. Nevertheless, it should be understood that the agent 408 may use any form of native signalling mechanism of the runtime environment of the application 114. In this context, the phrase 'native signalling mechanism' is construed to mean any signalling mechanism inherently available or accessible by the application 114.

Figure 4B:
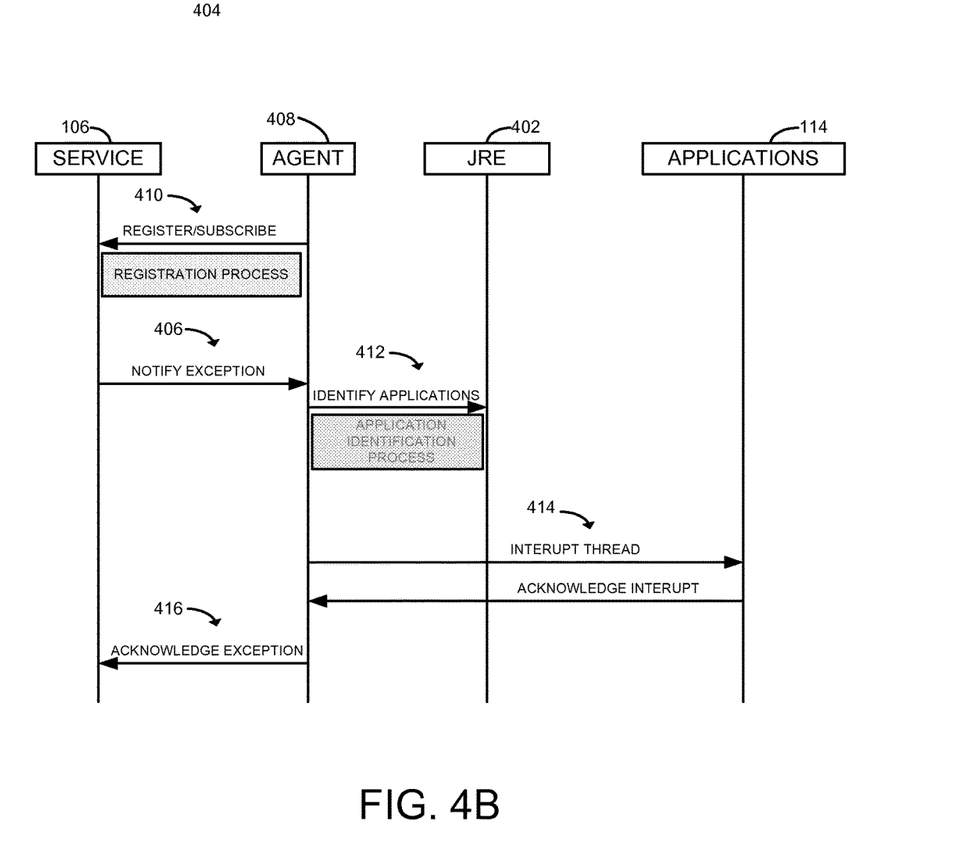
FIG. 4B illustrates an example sequence diagram showing how the application alerting service propagates failure notifications to each application according to one embodiment of the present disclosure.

FIG. 4B illustrates an example sequence diagram showing how the application alerting service 106 propagates failure notifications to each application 114 according to one embodiment of the present disclosure.

In step 410, the agent 408 performs a registration process to register its existence with the service 106. Thereafter, when a failure is detected, the service 106 transmits a failure notification 406 to the agent 408. Upon receipt of the failure notification, the agent 408 queries 412 the JRE 402 to determine what applications 114 are currently being executed on the computing resource 112. In one example, the agent 408 may determine the nature and type of applications 114 executed on its respective computing resource by accessing the active threads of each application 114.

Once the applications 114 on the computing resource 112 have been determined, the agent 408 notifies 414 each application 114 of the failure notification. As each application 114 acknowledges the failure notification, the agent forwards the acknowledgement 416 back to the service 106.

Figure 5:
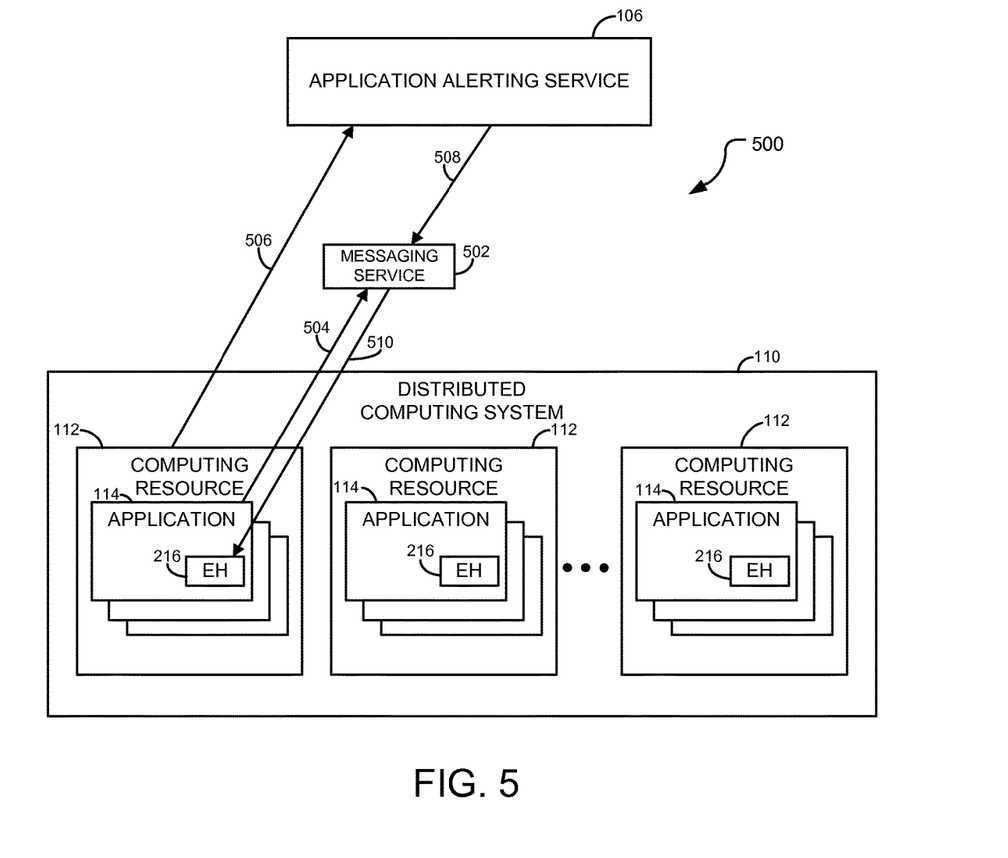
FIG. 5 illustrates an example process that is performed by the application alerting service to monitor computing resources of a computing infrastructure and alert affected application when the computing resources fail such that the applications may take one or more remedial actions according to one embodiment of the present disclosure.

FIG. 5 illustrates another example implementation of the application alerting system 500 according to one embodiment of the present disclosure. The particular implementation generally includes a messaging service 502 (e.g., ACTIVEMQ™ and/or RABBITMQ™) that may be executed on any suitable computing device, such as on one or more computing resources of the computing infrastructure 110.

The messaging service 502 functions in a subscription messaging model in which failure notifications are pushed to the applications 114 after those applications have subscribed to the messages via the messaging service. For example, an application 114 initially subscribes 504 to the messaging service 502. Thereafter, when the application alerting service 106 detects a failure 506 of a particular computing resource 112, it transmits a failure notification 508 to the messaging service 502, which determines that the application 114 is affected by the failure of that particular computing resource and notifies 510 the application 114 using the exception handler 216 of the affected application 114. Using the failure information provided through the exception handler 216, the application may take one or more remedial actions to alleviate any adverse effects that would have otherwise occurred as a result of the failure.

Figure 6:
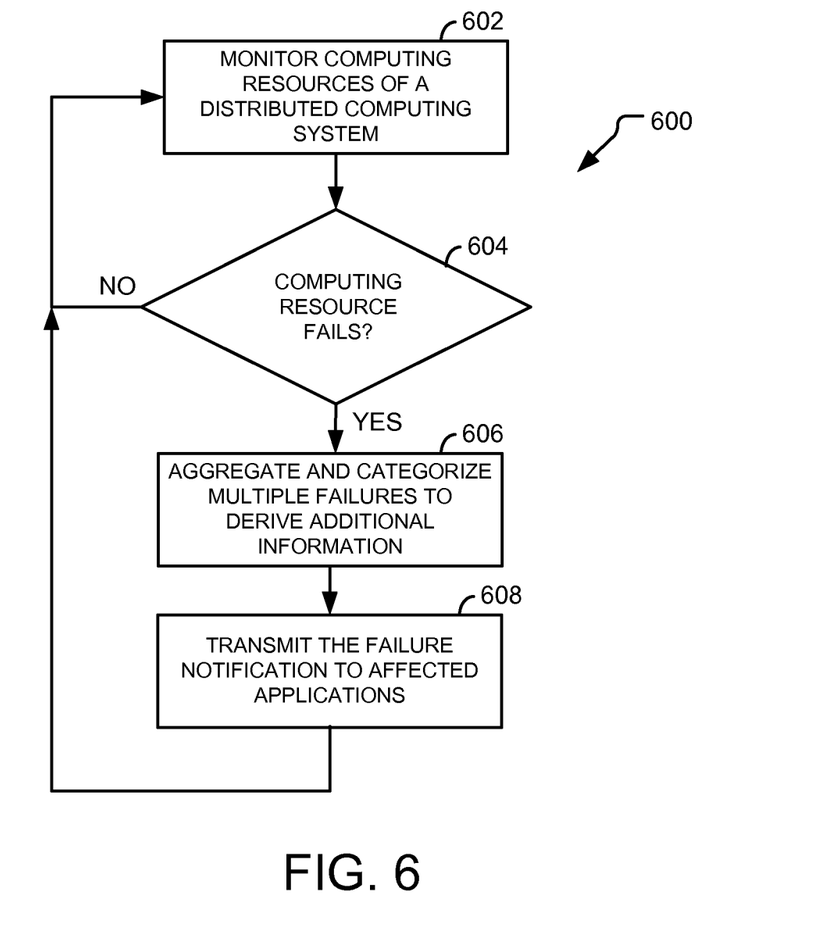
FIG. 6 illustrates an example process that is performed by the application alerting service to monitor computing resources of a computing infrastructure and alert affected application when the computing resources fail such that the applications may take one or more remedial actions according to one embodiment of the present disclosure.

FIG. 6 illustrates an example process 600 that is performed by the application alerting service 106 to monitor computing resources of a computing infrastructure and alert affected application when the computing resources fail such that the applications may take one or more remedial actions according to one embodiment of the present disclosure.

In step 602, the application alerting service 106 monitors one or more computing resources, such as hosts and/or virtual machines executed on the hosts for failures. In one embodiment, the service 106 periodically and/or aperiodically polls each computing resource 112 to determine any failures of the computing resources 112 by querying one or more service routines (e.g., system monitor or network analyzer) executed on the computing resource 112. In another embodiment, the service 106 receives exception events from the computing resources, such as SNMP messages transmitted by a network communication device.

In step 604, the service whether any computing resource has failed. If not, processing continues at step 602 in which the service continues monitoring the computing resources for failures. However, if a failure is detected, processing continues at step 606.

In step 606, the service 106 aggregates and categorizes multiple failures to derive any additional information. For example, the service 106 may categorize failure notifications according to the type of sub-system (e.g., data processing sub-system, switch sub-system, and/or storage sub-system), or according to a particular subset of computing resources 112. In one embodiment, the service 106 assigns a severity level to failure notifications according to a level of impact that the failure may have on each application 114.

In step 608, the service 106 transmits failure notifications to each affected application. In one embodiment, the service 106 transmits the failure notifications using a cross-platform messaging service, such as ACTIVEMQ™ and/or RABBITMQ™. In another embodiment, the service 106 propagates the failure notifications using an agent 408, such as one running on a Java virtual machine (JVM) executed within a Java runtime environment (JRE). In yet another embodiment, the service 106 propagates the failure notifications to each application 114 using an inter-process communication message (e.g., a remote procedure call (RPC)).

Once the failure notification has been transmitted to each affected application, processing continues at step 602 for continual monitoring and reporting of computing resource failures to affected applications. Nevertheless, when use of the application alerting service 106 is no longer needed or desired, the process ends.

Although FIG. 6 describes one example of a process that may be performed by the application alerting service 106 for monitoring and reporting of computing resource failures, the features of the disclosed process may be embodied in other specific forms without deviating from the spirit and scope of the present disclosure. For example, the application alerting service 106 may perform additional, fewer, or different operations than those operations as described in the present example. As another example, the steps of the process described herein may be performed by a computing system other than the computing system 102, which may be, for example, one of the virtual objects executed on the virtual computing environment.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 7:
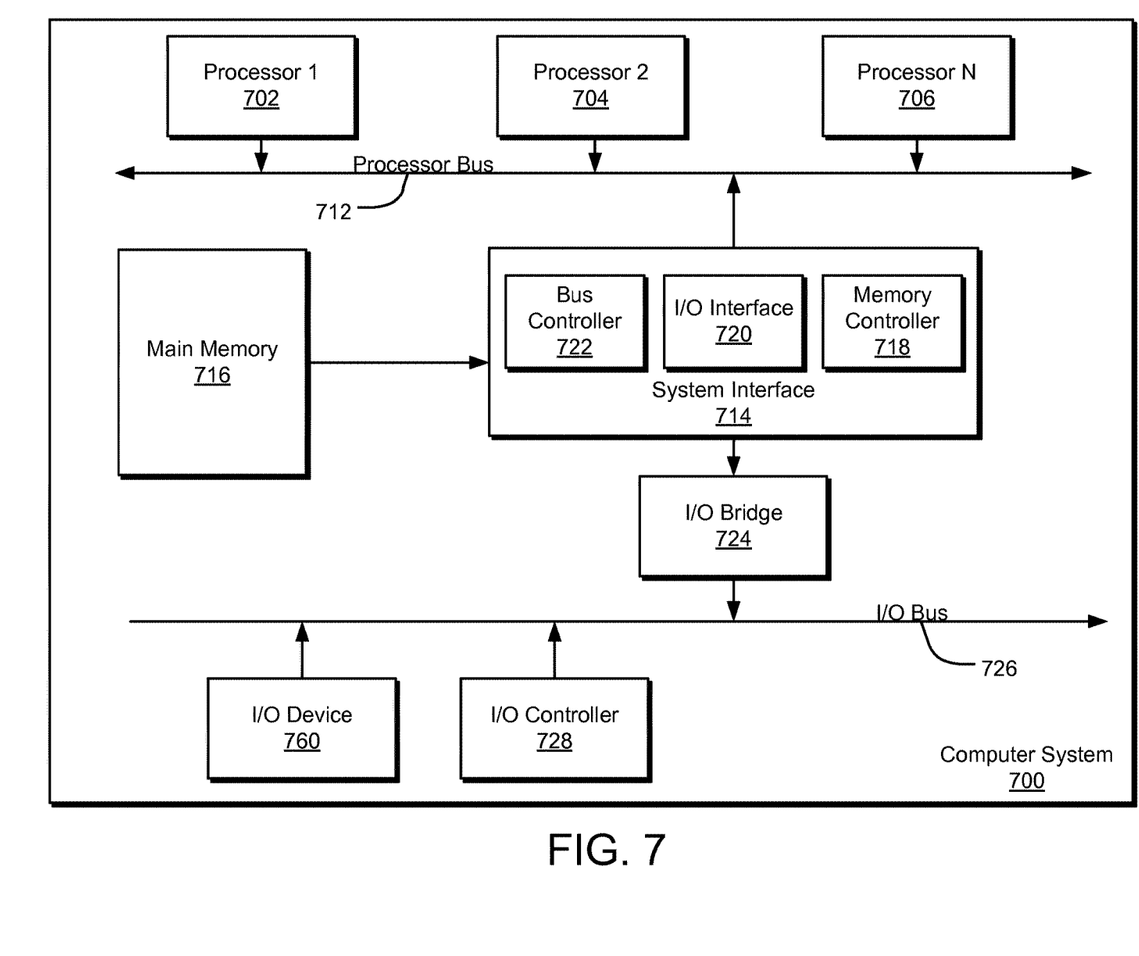
FIG. 7 illustrates an example computer system according to one embodiment of the present disclosure.

For example, FIG. 7 is a block diagram illustrating an example of a host or computer system 700 which may be used in implementing the embodiments of the present disclosure. The computer system (system) includes one or more processors 702-706. Processors 702-706 may include one or more internal levels of cache (not shown) and a bus controller or bus interface unit to direct interaction with the processor bus 712. Processor bus 712, also known as the host bus or the front side bus, may be used to couple the processors 702-706 with the system interface 714. System interface 714 may be connected to the processor bus 712 to interface other components of the system 700 with the processor bus 712. For example, system interface 714 may include a memory controller 713 for interfacing a main memory 716 with the processor bus 712. The main memory 716 typically includes one or more memory cards and a control circuit (not shown). System interface 714 may also include an input/output (I/O) interface 720 to interface one or more I/O bridges or I/O devices with the processor bus 712. One or more I/O controllers and/or I/O devices may be connected with the I/O bus 726, such as I/O controller 728 and I/O device 730, as illustrated.

I/O device 730 may also include an input device (not shown), such as an alphanumeric input device, including alphanumeric and other keys for communicating information and/or command selections to the processors 702-706. Another type of user input device includes cursor control, such as a mouse, a trackball, or cursor direction keys for communicating direction information and command selections to the processors 702-706 and for controlling cursor movement on the display device.

System 700 may include a dynamic storage device, referred to as main memory 716, or a random access memory (RAM) or other computer-readable devices coupled to the processor bus 712 for storing information and instructions to be executed by the processors 702-706. Main memory 716 also may be used for storing temporary variables or other intermediate information during execution of instructions by the processors 702-706. System 700 may include a read only memory (ROM) and/or other static storage device coupled to the processor bus 712 for storing static information and instructions for the processors 702-706. The system set forth in FIG. 7 is but one possible example of a computer system that may employ or be configured in accordance with aspects of the present disclosure.

According to one embodiment, the above techniques may be performed by computer system 700 in response to processor 704 executing one or more sequences of one or more instructions contained in main memory 716. These instructions may be read into main memory 716 from another machine-readable medium, such as a storage device. Execution of the sequences of instructions contained in main memory 716 may cause processors 702-706 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 716. Common forms of machine-readable medium may include, but is not limited to, magnetic storage medium (e.g., hard disk drive); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed:

1. An application alerting system comprising:
 a computing system comprising a processing system and at least one memory to store a service that is executed by the processing system to:
  monitor at least one of a plurality of virtual machines configured in a virtual computing environment to determine whether the one monitored virtual machine experiences a failure, wherein the monitored virtual machine stores and executes at least one application;
  when the one monitored virtual machine encounters a failure, identify a type of task performed by the virtual machine; and
  transmit a failure notification to the at least one application associated with the one monitored virtual machine, the failure notification including information associated with a type of the failure and the type of task performed by the virtual machine,
  wherein the at least one application determines a remedial action to mitigate the failure of the virtual machine based upon the type of the failure and the type of task performed by the virtual machine in response to the received failure notification.

2. The application alerting system of claim 1, wherein the service is executed by the processing system to monitor the one monitored virtual machine by polling the one monitored virtual machine.

3. The application alerting system of claim 1, wherein the service is executed by the processing system to monitor the one monitored virtual machine by receiving an exception event from the one monitored virtual machine.

4. The application alerting system of claim 3, wherein the exception event comprises a simple network management protocol (SNMP) message.

5. The application alerting system of claim 1, wherein the service is executed by the processing system to transmit the failure notification using a messaging service.

6. The application alerting system of claim 1, wherein the service is executed by the processing system to transmit the failure notification using a native signaling mechanism of a runtime environment of the at least one application.

7. The application alerting system of claim 6, wherein the service is executed by the processing system to transmit the failure notification using an agent to communicate with the native signaling mechanism, the agent being executed on the monitored virtual machine.

8. The application alerting system of claim 1, wherein the service is executed by the processing system to transmit the failure notification using an inter-process communication message.

9. The application alerting system of claim 1, wherein the service is executed by the processing system to aggregate and categorize a plurality of failures to provide additional information to the at least one application.

10. The application alerting system of claim 1, wherein the failure of the monitored virtual machine comprises at least one of an excessive memory usage, an excessive processor utilization, an insufficient processing power of the monitored virtual machine, an insufficient network bandwidth, a lost network connectivity, ceasing to function, and one or more neighboring virtual machines that experience a failure.

11. The application alerting system of claim 1, wherein the one monitored virtual machine comprises at least one of a host computing device and a virtual machine that is executed on the host computing device.

12. The application alerting system of claim 1, wherein the remedial action comprises at least one of slowing one or more services provided by the at least one application, limiting data transfer to or from the at least one application, and migrating the at least one application to another virtual machine.

13. The application alerting system of claim 1, wherein the at least one application is executed to, when the failure comprises a network communication failure, perform at least one of expanding a capacity of one or more communication buffers and including one or more connection state buffering mechanisms.

14. The application alerting system of claim 1, wherein the at least one application is executed to, when the failure comprises an excessive memory utilization, adding additional memory for use by the at least one application.

15. A method comprising:
 monitoring, using instructions stored in at least one memory and executed by at least one processor, at least one of a plurality of virtual machines configured in a virtual computing environment to determine whether the one monitored virtual machine experiences a failure, wherein the one monitored virtual machine executes at least one application; and
 when the one monitored virtual machine encounters a failure, identifying, using the instructions executed by the at least one processor a type of task performed by the virtual machine; and
 transmitting, using the instructions executed by the at least one processor, a failure notification to the at least one application associated with the one monitored virtual machine, the failure notification including information associated with the failure and the type of task performed by the virtual machine,
 wherein the at least one application determines a remedial action to mitigate the failure of the virtual machine based upon a type of the failure and the type of task performed by the virtual machine in response to the received failure notification.

16. The method of claim 15, further comprising monitoring the one monitored virtual machine by polling the one monitored virtual machine.

17. The method of claim 15, further comprising monitoring the one monitored virtual machine by receiving an exception event from the one monitored virtual machine.

18. The method of claim 15, further comprising transmitting the failure notification using a messaging service.

19. The method of claim 15, further comprising transmitting the failure notification using a native signaling mechanism of a runtime environment of the at least one application.

20. A virtual computing environment comprising:
- at least one of a plurality of virtual machines comprising one or more hosts that each executes one or more virtual machines, the at least one virtual machine executing a plurality of applications and comprising at least one memory for executing instructions that are executed by a processing system to:
  - receive a failure notification from a service, wherein the service monitors the one virtual machine to determine whether the one monitored virtual machine experiences a failure, identifies a type of task performed by the virtual machine, and transmits the failure notification and the type of task performed by the virtual machine when the one monitored virtual machine encounters a failure, wherein the failure notification including information associated with the failure; and
- forward the failure notification to at least one of the applications,
- wherein the at least one application receives the failure notification and determines a remedial action based upon a type of the failure and the type of task performed by the virtual machine in response to the received failure notification.

* * * * *